United States Patent
Candido et al.

(10) Patent No.: US 10,419,946 B1
(45) Date of Patent: Sep. 17, 2019

(54) SYSTEMS AND METHODS FOR PLANNING HIGH ALTITUDE PLATFORM-BASED COMMUNICATION NETWORKS

(71) Applicant: LOON LLC, Mountain View, CA (US)

(72) Inventors: Salvatore J. Candido, Mountain View, CA (US); Wanda Hung, Mountain View, CA (US)

(73) Assignee: LOON LLC, Mountain View, CA (US)

( * ) Notice: Subject to any disclaimer, the term of this patent is extended or adjusted under 35 U.S.C. 154(b) by 0 days.

(21) Appl. No.: 15/915,049

(22) Filed: Mar. 7, 2018

(51) Int. Cl.
  *H04B 7/185* (2006.01)
  *H04W 16/18* (2009.01)
  *H04W 84/06* (2009.01)

(52) U.S. Cl.
  CPC ............ *H04W 16/18* (2013.01); *H04W 84/06* (2013.01)

(58) Field of Classification Search
  CPC ............ H04B 7/18504; H04B 7/18502; H04B 7/18576; H04B 10/1123; H04B 7/1851; H04B 7/18519; H04B 7/18584; H04B 7/18506; H04B 7/2606; B64B 1/40; G01S 19/42; G01S 5/06; G01S 5/12; H04W 4/023; H04W 4/027; H04W 24/04; H04W 28/10; H04W 28/18; H04W 4/021; H04W 84/005; H04W 40/20; H04W 84/06; H04W 84/18; H04W 84/22; H04W 40/24; H04L 41/042; H04L 41/044; H04L 41/0893; H04L 45/44
  See application file for complete search history.

(56) References Cited

U.S. PATENT DOCUMENTS

| | | |
|---|---|---|
| 5,515,367 A | 5/1996 | Cox, Jr. et al. |
| 6,058,260 A | 5/2000 | Brockel et al. |
| 6,336,035 B1 | 1/2002 | Somoza et al. |
| 6,487,414 B1 | 11/2002 | Tanay et al. |
| 6,771,966 B1 | 8/2004 | Chow |
| 8,820,678 B2 * | 9/2014 | DeVaul ................ G05D 1/104 244/96 |
| 8,948,927 B1 | 2/2015 | Piponi |
| 9,401,759 B2 | 7/2016 | Noerpel et al. |
| 9,571,978 B1 | 2/2017 | Ananth |
| 9,648,502 B2 | 5/2017 | Carey et al. |
| 2005/0097161 A1 | 5/2005 | Chiou et al. |
| 2006/0172707 A1 | 8/2006 | Stern-Berkowitz et al. |
| 2008/0172262 A1 * | 7/2008 | An ................ G06Q 10/0637 705/7.37 |
| 2014/0014770 A1 * | 1/2014 | Teller ................ B64B 1/40 244/97 |
| 2015/0319605 A1 * | 11/2015 | Gupta ................ H04M 3/085 455/405 |

(Continued)

OTHER PUBLICATIONS

International Search Report and Written Opinion for Application No. PCT/US2019/020694 dated Jun. 20, 2019.

*Primary Examiner* — Allahyar Kasraian
(74) *Attorney, Agent, or Firm* — Botos Churchill IP Law LLP

(57) ABSTRACT

A method for planning a high altitude platform-based communication network includes aggregating data from at least one data source, wherein the data includes environmental data. Based on the aggregated data, a plurality of network expansion potential scores are computed according to geographic location. A visual output is generated based on the computed plurality of network expansion potential scores.

20 Claims, 4 Drawing Sheets

(56) References Cited

U.S. PATENT DOCUMENTS

| | | |
|---|---|---|
| 2016/0371985 A1 | 12/2016 | Kotecha |
| 2018/0086483 A1* | 3/2018 | Priest ................ G06F 17/30241 |
| 2018/0090016 A1* | 3/2018 | Nishi ................... G08G 5/0039 |
| 2019/0033863 A1* | 1/2019 | Candido ............. G05D 1/0088 |
| 2019/0033884 A1* | 1/2019 | Candido ................ G05D 1/042 |
| 2019/0033885 A1* | 1/2019 | Candido ................ G05D 1/042 |
| 2019/0033886 A1* | 1/2019 | Candido ............. G08G 5/0034 |
| 2019/0035298 A1* | 1/2019 | Rhodes ................... G09B 9/24 |

\* cited by examiner

SYSTEMS AND METHODS FOR PLANNING HIGH ALTITUDE PLATFORM-BASED COMMUNICATION NETWORKS

BACKGROUND

Automated network planning for terrestrial wireless communication networks typically involves the use of algorithms that simulate radio frequency (RF) signal propagation and rely upon models of terrestrial communication towers, population data, and/or existing connectivity data to determine where to place new terrestrial communication towers. However, communication networks projected from high altitude platforms (HAPs), such as networks in which communication nodes are embodied as aerial vehicles floating in the atmosphere, are subject to technical challenges not faced by terrestrial networks and unaddressed by traditional network planning approaches. For instance, in HAP-based networks the communication nodes are subject to environmental influence, such as stratospheric winds, move vertically and laterally relative to the earth, and thus have a highly dynamic state. Additionally, the cost of providing service via an HAP-based communication network in a region depends on the navigability of nodes through the atmosphere in and around that region, and the navigability varies over time based upon season, weather, and/or other factors. Such a cost is also unaddressed by traditional network planning approaches. In view of the foregoing, it would be beneficial to have improved systems and methods for planning communication networks projected from HAPs.

SUMMARY

In one aspect, this disclosure describes a method for planning an HAP-based communication network. In embodiments, the method includes aggregating data from at least one data source, wherein the data includes environmental data. Based on the aggregated data, a plurality of network expansion potential scores are computed according to geographic location. A visual output is generated based on the computed plurality of network expansion potential scores.

In embodiments, the at least one data source includes population data according to at least one of geographic location or time.

In embodiments, the at least one data source includes network presence estimates according to at least one of geographic location or time.

In embodiments, the environmental data includes wind pattern data according to at least one of geographic location, altitude, or time.

In embodiments, the at least one data source includes a source of data regarding a navigation efficiency of a stratospheric platform according to at least one of geographic location, altitude, or time.

In embodiments, the method further comprises computing an ability of an aerial vehicle to remain over a service region based on the data regarding the navigation efficiency of the stratospheric platform.

In embodiments, the at least one data source includes mobile network statistical intelligence data.

In embodiments, the method further comprises retrieving, from the at least one data source, average revenue per user according to at least one of geographic location or time.

In embodiments, the method further comprises computing a plurality of revenue scores according to geographic location, with the computing of the network expansion potential scores being based on the computed plurality of revenue scores.

In embodiments, the method further comprises computing a plurality of cost-of-service scores according to geographic location, with the computing of the network expansion potential scores being based on the computed plurality of cost-of-service scores.

In embodiments, the method further comprises computing a plurality of revenue scores according to geographic location; and computing a plurality of cost-of-service scores according to geographic location, wherein the computing of the network expansion potential scores is based on the plurality of revenue scores and the plurality of cost-of-service scores.

In embodiments, the visual output includes a graphical representation of the computed plurality of revenue scores.

In embodiments, the visual output includes a graphical representation of the plurality of cost-of-service scores.

In embodiments, the visual output includes a graphical representation of the computed plurality of network expansion potential scores.

In embodiments, at least one of the aggregating, the computing, or the generating, is periodically repeated based on updated data.

In another aspect, the present disclosure describes a system for planning an HAP-based communication network. The system comprises: at least one data source, a user interface, and at least one computing device communicatively coupled to the at least one data source. The at least one data source includes a data source storing environmental data. The at least one computing device is configured to: (1) aggregate data from the at least one data source, wherein the data includes the environmental data; (2) compute, based on the aggregated data, a plurality of network expansion potential scores according to geographic location; (3) generate a visual output generated based on the computed plurality of network expansion potential scores; and (4) cause the user interface to display the generated visual output.

In embodiments, the environmental data includes wind pattern data according to at least one of geographic location, altitude, or time.

In embodiments, the at least one data source includes a source of data regarding a navigation efficiency of a stratospheric platform according to at least one of geographic location, altitude, or time.

In embodiments, the at least one computing device is further configured to compute an ability of an aerial vehicle to remain over a service region based on the data regarding the navigation efficiency of a stratospheric platform.

In another aspect, the present disclosure describes a non-transitory computer-readable storage medium storing a program for planning an HAP-based communication network. In particular, the program includes instructions which, when executed by a processor, causes a computing device to implement a method for planning an HAP-based communication network planning. The method comprises: (1) aggregating data from at least one data source, wherein the data includes environmental data; (2) computing, based on the aggregated data, a plurality of cost-of-service scores according to geographic location; and (3) generating a visual output based on the computed plurality of cost-of-service scores.

BRIEF DESCRIPTION OF THE DRAWINGS

Various aspects and features of the present systems and methods for planning HAP-based communication networks are described herein below with references to the drawings, wherein.

DETAILED DESCRIPTION

The present disclosure is directed to systems and methods for planning communication networks generated from base station some of which are aboard aerial vehicles, such as high altitude platforms (HAPs) like stratospheric balloons. More specifically, the systems and methods of the present disclosure enable worldwide market opportunities for communication networks projected from HAPs to be identified based on traditional parameters as well as atmospheric impacts and other factors, thereby facilitating improvements to system efficiency and network utility. In one aspect, the present disclosure describes a collection of machine-aided optimization systems that do planet-scale operations research to guide deployments of HAP-based communication networks, taking into account environment influence and the highly dynamic state of network nodes. One example of such an HAP-based communication network is one that is projected from stratospheric platforms, e.g., aerial vehicles, airships, or other unmanned aerial vehicles, capable of relaying connectivity and/or internet access between ground stations and remote users with LTE handsets. The systems and methods of the present disclosure, among other things, tackle the problems of estimating opportunity to capture market volume and estimating economies of agglomeration.

The systems and methods described herein are highly scalable and, in some aspects, are automated and do not require analyst knowledge in the loop. For example, in one example embodiment herein, a system and method are provided that, by push of one or more buttons or a regular periodic automated run, generate a ranking of business opportunities worldwide. In this manner, ranking conclusions may be efficiently reexamined based on new market data, as market assumptions change, and as flight vehicles evolve. In a further aspect, a system and method of the present disclosure involves a pipeline that performs an amount of rote work impractical for an analyst and generates information that can be used to exploit the economies of agglomeration of network deployment in multiple regions.

Figure 1:
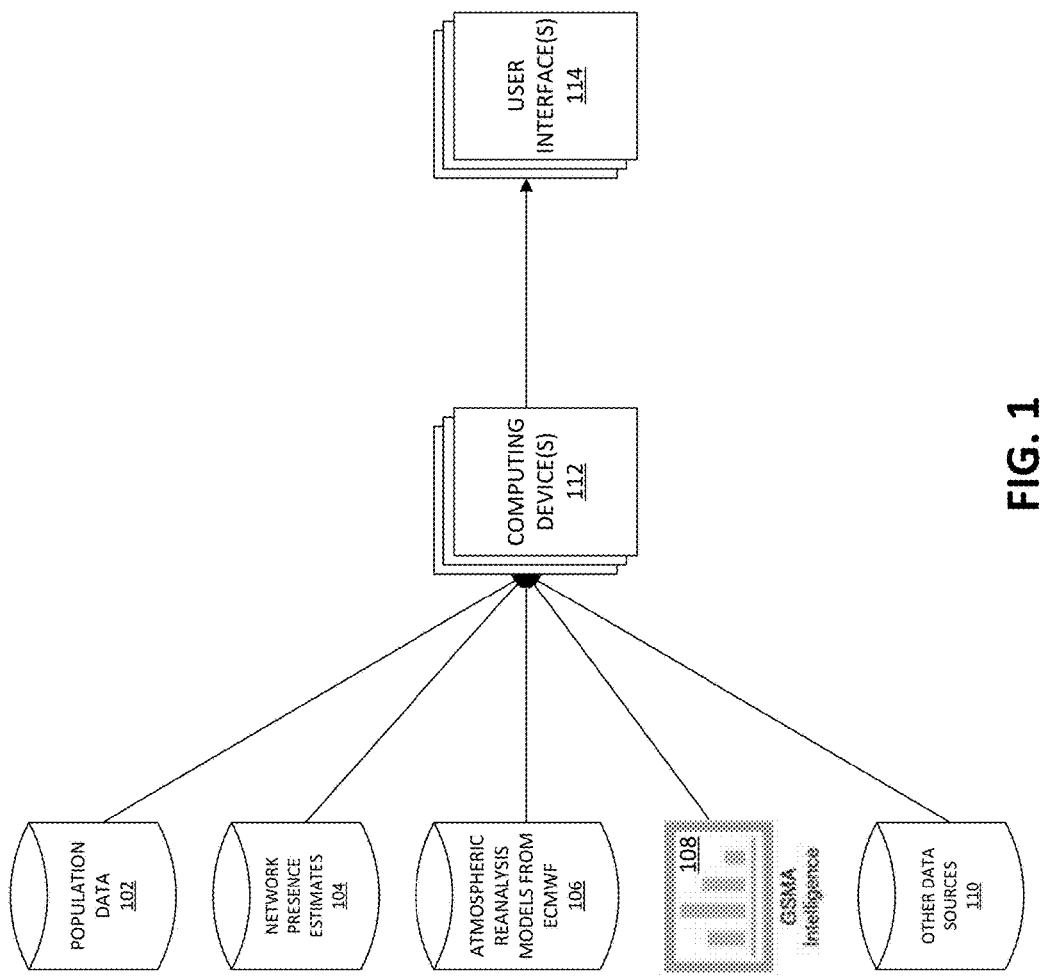
FIG. 1 is a schematic block diagram showing an illustrative system for planning an HAP-based communication network, in accordance with an embodiment of the present disclosure.

FIG. 1 shows an example system 100 for planning an HAP-based communication network, in accordance with various embodiments herein. The system 100 includes one or more computing devices 112, one or more user interfaces 114, and a variety of data sources 102, 104, 106, 108, 110. The data sources 102, 104, 106, 108, 110 are communicatively coupled to the computing device(s) 112 by way of respective communication paths, and the computing device(s) 112 are communicatively coupled to the user interface(s) 114 by way of one or more additional communication paths.

Figure 4:
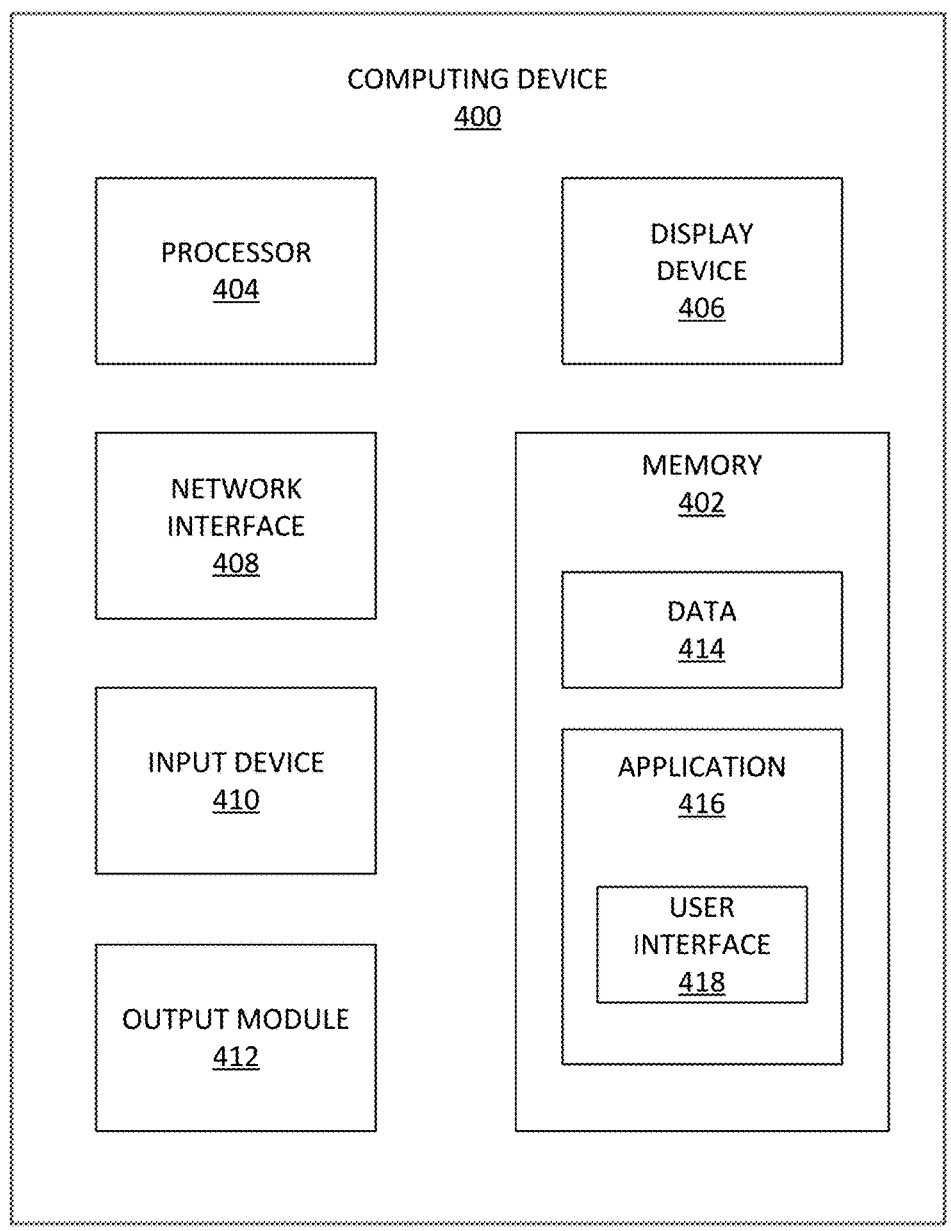
FIG. 4 is a schematic block diagram of an illustrative embodiment of a computing device that may be employed in various embodiments of the present system, for instance, as part of the system or components of FIG. 1, in accordance with an embodiment of the present disclosure.

The computing device(s) 112 may generally be any type of computing device, such as a personal computer, server, and/or the like. Details regarding one example embodiment of the computing device(s) 112 are shown in FIG. 4, which is described below. The data sources include a population database 102 (storing, for example, population density estimates according to geographic location and/or other types of population-related data); a network presence estimates database 104 (storing, for example, estimates of network presence according to geographic location); a database 106 storing, for example, atmospheric reanalysis models, such as from the European Centre for Medium-Range Weather Forecasts (ECMWF) or the National Oceanic and Atmospheric Administration (NOAA), that can be post-processed to indicate efficiency of stratospheric navigation according to geographic location and/or altitude; a GSMA (or LTE or other network) intelligence database 108; and/or other types of databases 110. In general, and as described further below, the computing device(s) 112 execute one or more algorithms for planning an HAP-based network, utilizing data from one or more of the data sources 102, 104, 106, 108, 110, and generate one or more items of visual output, such as market opportunity rankings by geographic region, rankings of agglomeration of two or more geographic regions and/or the like, to be provided via the user interface(s) 114.

Figure 2:
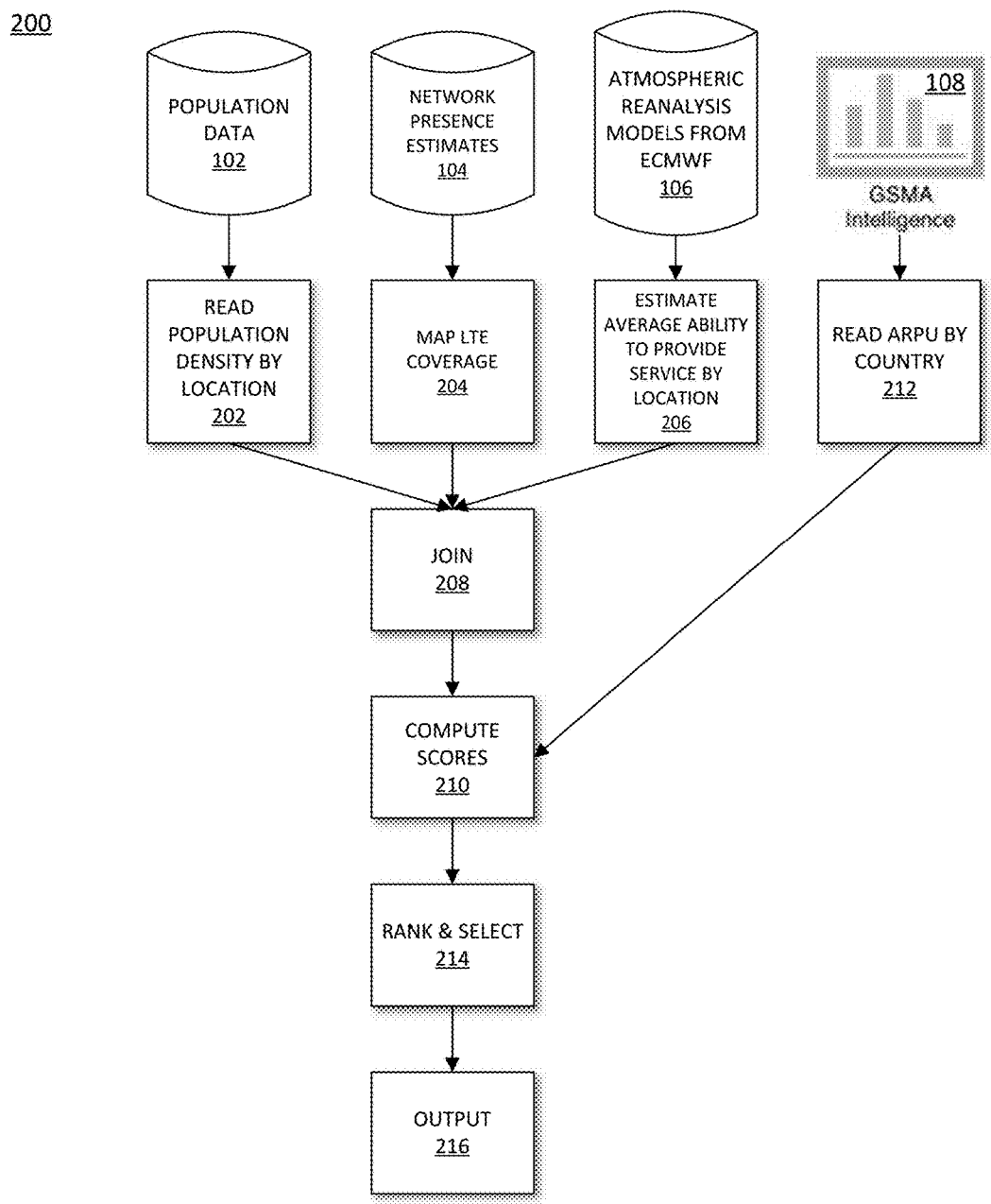
FIG. 2 is a flowchart showing an illustrative method for planning an HAP-based communication network, in accordance with a first embodiment of the present disclosure.

Having provided an overview of the system 100 in the context of FIG. 1, reference is now made to FIG. 2, which is a flowchart illustrating an example method 200 for planning an HAP-based network, in accordance with an embodiment of the present disclosure. In particular, FIG. 2 illustrates an example method 200 for planning an HAP-based communication network by utilizing the computing device(s) 112 and/or data sources 102, 104, 106, 108, 110 to identify mobile network expansion potential by geographic region, and generate a corresponding output via the user interface(s) 114. Mobile network expansion (MNE), in this context, involves an HAP-based communication network provider partnering with a carrier to deliver a network as a service that functionally replaces an expansion of the partner's radio access network. This effectively extends the reach of their network to a larger geographic footprint.

The MNE potential estimation is implemented as a data-processing pipeline run by a system (e.g., including one or more of the computing device(s) 112) that launches processing pipelines on multiple machines to do parallel computation. A detailed flow chart of the pipeline is illustrated in FIG. 2. At blocks 202, 204, and 206, the pipeline starts with parallel data fetch from various sources. More particularly, at block 202, population density data is read from the population database 102. At block 204, estimates of existing terrestrial networks and/or projected expansion of terrestrial networks, obtained for instance from the network presence estimates database 104, are joined to assess where there are unconnected or under-connected people.

In one example, unserved and underserved users are grouped in a single block rather than segmenting the data by carrier, but the system 100 can be used to ask questions about new market entrants and assumptions on adoption rates by segmenting data by carrier. The system 100 ranks potential by geographic region, such as country, and also provides an estimate of where in each region/country the largest impact can be made. Potential market is approximated as a function of revenue and cost of revenue. Due to uncertainty in accurately predicting both of those terms, in some examples, a ranking of opportunity around the globe is generated rather than a forecast of profits over different geographies.

At block 206, reanalysis models of stratospheric data, such as from NOAA or the ECMWF, are read from the database 106 and processed to estimate the navigation efficiency of a stratospheric platform according to geographic location.

At block 208, a number of data sources, including: (1) raw population estimates, such as from the population database 102 (block 202); (2) existing or estimated future network presence (block 204); (3) data regarding the estimated navigation efficiency of a stratospheric platform (e.g., from post-processed ECMWF) weather data in the database 106), which is an estimate of ease of a stratospheric platform being kept in place, and corresponds to diversity of winds aloft (block 206); (4) estimates of amounts of time required to return to locations using atmospheric wind data (e.g., estimated based on extremely post-processed ECMWF weather data in the database 106), which estimate transit and return times of vehicles over long (multi-day) duration flights; (5) long-term evolution (LTE) network simulation data; and/or (6) worldwide average revenue per user (ARPU) data, over a worldwide lattice of geographic cells, such as S2 cells (which, as one of skill in the art would appreciate, are spatially indexed cells used to uniquely represent geographic locations across the Earth using spherical geometry), over a relatively fine granularity (block 212), are joined by cell area.

At block 210, the MNE potential scores for each S2 cell area are computed according to any suitable algorithm, for example, based on equation (4) shown below, the ARPU data from block 212 (described below) and/or other information. In order to provide continuous service in a region, when an aerial vehicle drifts away, another aerial vehicle will arrive to provide service. Overprovisioning is a strategy used in fleet planning to utilize additional flight systems to cover the gap in service when aerial vehicles drift away. This means that the cost of service is not only dependent on the number of people to serve in the region, but also vary depending on the stratospheric wind at different times. One aerial vehicle may be needed to serve an area when the wind is calm, but on "bad" days when it is volatile in the stratosphere, many more aerial vehicles are needed.

Although other suitable computational approaches are also contemplated, the following description and equations are provided to illustrate one computational approach, by way of example and not limitation. For each S2 cell, at block 210, a function proportional to revenue and cost of service may be generated. The cost of service for an area is the total number of aerial vehicles required to serve the people on the ground over a period of time. Cost of service for an S2 cell, in some examples, may be estimated to be proportional to:

$$C = o_1 g + o_2 (1-g) \quad (1)$$

where g is the percentage of days the vehicle can be kept on station over the service region, $o_1$ is the number of aerial vehicles required at a particular time during those periods, and $o_2$ is the number of aerial vehicles required to cover the cell plus the number of aerial vehicles that need to be staged to continue to cover the cell through the "bad" time. Pure cost per day can be recovered by multiplying the cost of service C by the total cost of a flight system per day.

There are different ways to estimate this, but the most basic package involves using the estimated navigation efficiency of a stratospheric platform (block 206) to estimate g and using a constant and representative $o_1$ and $o_2$ to create a reasonable ratio. $o_1$ can be improved via using access layer (e.g., LTE) network simulation data to get the appropriate number of aerial vehicles for a particular geography. In reality, the ratio between $o_1$ and $o_2$ varies over time. $o_2$ can be improved by multiplying $o_1$ by the overprovisioning number estimated by the amount of time required to return to the current location using atmospheric wind data. In practice the general trend can be assessed via the most basic estimate (estimated navigation efficiency of a stratospheric platform being the dominating factor) and a quite good estimate can be had by varying $o_2$ regionally.

Although other suitable estimate approaches are possible, in one example, revenue for an S2 cell may be estimated to be proportional to a fixed revenue (which can be zero) plus the region/country's ARPU a multiplied by the average revenue generated at this location $r_l$. This can be broken into two terms to represent full revenue collection during good steering times and a fraction of revenue based on the overprovisioning plan to be deployed $\frac{[?]}{}_2$ as compared to the overprovisioning required for 100% availability.

$$R = \bar{r} + \alpha[g r_l + (1-g) r_l \min(1, \delta_2/o_2)] \quad (2)$$

If, for example, limited fleet size constraints were not modeled, this can be reduced to the much simpler form:

$$R = \bar{r} + a r_l \quad (3)$$

ARPUs read at block 212 may, in this example, be input data to the score computation at block 210. Estimates of average revenues (varied worldwide) are based on any model of the revenue generated per market, such as a revenue sharing model. For example, the revenue to be shared may be estimated based on uncovered (underserved and unserved) population density. One can also consider market adoption rates and users available per potential telecom partner in this calculation.

If a profit forecast were to be attempted, costs would be subtracted from revenue. On the other hand, a ranking of market potential may be computed in any of a variety of ways. For example, potential may be considered to be the quotient of the two estimates, as shown by equation (4) below.

$$P = R/C \quad (4)$$

This creates a dimension-free quantity that is used for a few purposes: First potential can be plotted as a visual inspection. Second, the quantity can be used to generate service regions for various potential partners using computer vision-style connected component techniques, e.g., flood fill. Third, the quantity can be used at block 214 to rank countries (and partners) throughout the world in order of potential. For instance, based on the S2 cell-level potentials computed at block 210, a flood fill algorithm may be utilized at block 214 to identify a number of high-potential, connected regions in a region/country and mark them as good potential service regions. Owing to the scalability of the method 200, estimates can be easily adjusted as market assumptions change, terrestrial network or population data is updated, or the flight system is modified.

At block 216, a coarse, worldwide gridded estimated projection of potential is generated as a unitless score that grows higher with more available users (scaled by regional ARPU) and lowers as it becomes increasingly expensive for an HAP-based communication network provider to provide service in that area. Region/country potential score is aggregated based on the estimates over all the S2 cells in the area. This dimension-free quantity of scoring is easy to be plotted as a worldwide heat map for visual inspection or apply computer vision-style connected component techniques, such as flood fill, to generate higher potential service regions within the countries. It also helps the partnerships team set priorities with the ability to rank countries and telco partners throughout the world.

Figure 3:
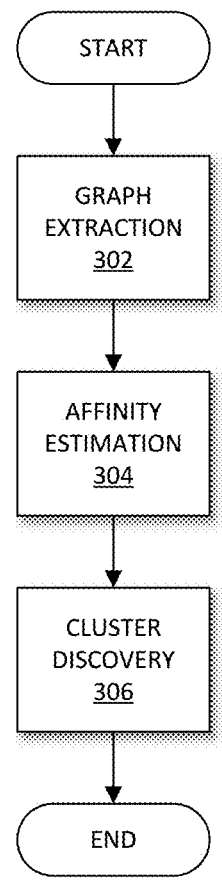
FIG. 3 is a flowchart showing an illustrative method for planning an HAP-based communication network, in accordance with a second embodiment of the present disclosure.

Reference is now made to FIG. 3, which is a flowchart illustrating an example method 300 for planning an HAP-based network, in accordance with another embodiment of the present disclosure. In particular, FIG. 3 illustrates an example method 300 of utilizing regional clustering for HAP-based communication network planning. Serving data via high altitude aerial vehicles to some specific groups of countries can be far more efficient than other groups of countries or a single country. Aerial vehicles in service will leave the targeted region due to winds from time to time. Additional flight systems are used to cover that gap in service, which is referred to as overprovisioning. For the overprovisioned flights, the network service provider bears the costs for that flight system without it generating revenue. However, if that aerial vehicle's transit back to the original service region was over another service region the utilization of all the flight systems would be higher. Thus, not every group of service areas is equally efficient.

Patterns describing the economies of agglomeration of specific groups of countries or regions may be mined and used for business deployment planning. This clustering process generally involves mining historical wind data, predicting transit and return times of aerial vehicles at all parts of the world, and looking for the economies of agglomeration of specific groups of countries or regions where aerial vehicles tend to travel in loops across various times of the year. Using the knowledge of wind patterns to predict these effects enables a network provider to make better business planning decisions, improve efficiency of the fleet, and have a significant impact on the overall business over longer horizons. The amount of time-series weather data, simulation of flight trajectories, and exploration space make this problem non-trivial. Service regions within each geography, e.g., country, are selected as graph nodes for exploration. A distributed system is developed to efficiently reflow simulated trajectories of long-duration flights over a cluster of distributed machines to estimate transit times between these different regions. The pipeline has three main phases: (1) graph extraction, (2) affinity estimation, and (3) cluster discovery.

A graph is incrementally generated at block 302 by asking the distributed system to build and retrieve connections (edge) and transit times (weight) via a Monte Carlo sampling-based procedure. Graph extraction is the process of choosing a set of nodes corresponding to countries or service regions. The naive algorithm involves picking arbitrary points within each region/country, e.g., the center point or the S2 cell with the highest MNE potential as graph nodes. In other embodiments, the algorithm may rely more heavily on clusters of MNE potential to extract multiple regions within single countries or drop political boundaries altogether.

The affinity graph is thus learned, stored, and improved over time at block 304. Monte Carlo sampling of transit times between regions at different historical periods of time is used to incrementally refine estimates of affinities on each graph edge. Affinity estimation uses Monte Carlo sampling to avoid requiring an exhaustive and intractable amount of simulation, and to enable clusters to emerge in the discovery process with a relatively small amount of samples. Estimates of the amounts of time required to return from one location to another, generated using atmospheric wind data, are used as estimates of affinity between regions.

A controller job is used to run the Monte Carlo portion of the code and periodically serialize the graph. This ability to create estimates of transit times between regions on the fly avoids the need to materialize all transit time estimates for every region in the world.

According to one non-limiting example, a core data structure is used in the form of a directed graph with nodes representing regions and edges storing affinity from the source region to destination region. One could imagine a wide range of summary statistics being useful in the discovery phase. The simplest is perhaps the mean transit time. To preserve flexibility a coarse histogram of transit times on each edge may be kept. Although other suitable algorithms are also contemplated, in some examples, an algorithm such as the following algorithm may be used to generate affinity estimates.

```
G←F load graph from disk (potentially with empty edges
    from graph extraction)
for i=1 to anytime:
    t0←sample time in our corpus of winds prompt reflow
        cluster to load wind estimates from [t0, t0+30 days]
    for j=1 to K:
        dest_node←sample country from graph
        prompt reflow cluster to estimate transit times with
            target at the S2 cells for dest_node
        (denote estimates as V)
        for source_node in graph:
            add   V(S2   on   source_node)   to   affinity
                (source_node, dest_node)
            insert affinity(source_node, dest_node) back into
                G
    if i % C==0: checkpoint serialized graph
```

The above pseudocode, which is provided by way of example and not limitation, can be structured as a service that runs indefinitely and provides incrementally improving affinity estimates by snapshotting the graph periodically.

At block 306, the region clustering phase takes the graph from block 304 as input and runs standard graph clustering techniques. For instance, with the affinity graph generated at block 304, graph clustering algorithms are used to find pseudo-cliques to identify the economies of agglomeration of countries that are best suited to deploy HAP-based communication network service as a group. In some embodiments, the same type of clustering used to find pseudo-cliques on social graphs is used at block 306 to compute clusters of interest. Since this graph is relatively small relative to most social graphs, exact methods, which may be inefficient methods, and in-memory computation may be used. A summary function may be used to map the histogram on each edge to a scalar affinity. In some embodiments, this graph (and the histogram summaries) may be viewed as time-varying. This is particularly useful for detecting that pseudo-periodic disturbances, such as seasonal patterns or trends spanning multiple years, e.g., the quasi-biennial oscillation, destroy the affinities within a cluster.

The clusters learned at block 306 can be tested via forward simulation of the network system and analyzed as desired. Using the knowledge of the wind patterns to predict these effects enables an HAP-based communication network provider to make better business planning decisions, improve efficiency of the fleet, and have a significant impact in the overall business over longer horizons.

FIG. 4 is a schematic block diagram of a computing device 400 that may be employed in accordance with various embodiments described herein. Although not explicitly shown in FIG. 1, in some embodiments, the computing device 400, or one or more of the components thereof, may further represent one or more components (e.g., the computing device(s) 112, the user interface(s) 114, and/or the like) of the system 100. The computing device 400 may, in various embodiments, include one or more memories 402, processors 404, display devices 406, network interfaces 408, input devices 410, and/or output modules 412. The memory 402 includes non-transitory computer-readable storage media for storing data and/or software that is executable by the processor 404 and which controls the operation of the computing device 400. In embodiments, the memory 402 may include one or more solid-state storage devices such as flash memory chips. Alternatively, or in addition to the one or more solid-state storage devices, the memory 402 may include one or more mass storage devices connected to the processor 404 through a mass storage controller (not shown in FIG. 4) and a communications bus (not shown in FIG. 4). Although the description of computer readable media included herein refers to a solid-state storage, it should be appreciated by those skilled in the art that computer-readable storage media may be any available media that can be accessed by the processor 404. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which may be used to store the desired information and which can be accessed by computing device 400.

In some embodiments, the memory 402 stores data 414 and/or an application 416. In some aspects the application 416 includes a user interface component 418 that, when executed by the processor 404, causes the display device 406 to present a user interface, for example a graphical user interface (GUI) (not shown in FIG. 4). The network interface 408, in some embodiments, is configured to couple the computing device 400 and/or individual components thereof to a network, such as a wired network, a wireless network, a local area network (LAN), a wide area network (WAN), a cellular network, a Bluetooth network, the Internet, and/or another type of network. The input device 410 may be any device by means of which a user may interact with the computing device 400. Examples of the input device 410 include without limitation a mouse, a keyboard, a touch screen, a voice interface, a computer vision interface, and/or the like. The output module 412 may, in various embodiments, include any connectivity port or bus, such as, for example, a parallel port, a serial port, a universal serial bus (USB), or any other similar connectivity port known to those skilled in the art.

The embodiments disclosed herein are examples of the present systems and methods and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present systems and methods. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A method for planning a high altitude platform-based communication network, the method comprising:
   aggregating data from at least one data source, wherein the data includes environmental data comprising wind pattern data according to at least one of geographic location, altitude or time;
   determining by one or more processors based on the aggregated data whether communication coverage gaps exist in one or more geographic locations to identify a plurality of network expansion potential scores according to geographic location;
   estimating, by the one or more processors according to the wind pattern data, a navigation efficiency for a set of stratospheric balloon high altitude platforms, the navigation efficiency estimate indicating a likelihood of keeping a given balloon on station at a selected geographic service region over a period of time;
   evaluating, by the one or more processors, the plurality of network expansion potential scores based on the navigation efficiency to assess potential coverage for an unconnected or under-connected population;
   identifying, by the one or more processors based on the potential coverage for the unconnected or under-connected population, one or more geographic regions as regions to be served by the high altitude platform-based communication network; and
   generating, by the one or more processors for presentation to one or more users of a display device, a visual output based on the one or more geographic regions as regions to be served by the high altitude platform-based communication network.

2. The method of claim 1, wherein the at least one data source includes population data according to at least one of geographic location or time.

3. The method of claim 1, wherein the at least one data source includes network presence estimates according to at least one of geographic location or time.

4. The method of claim 1, wherein the at least one data source includes a source of data regarding navigation efficiency of the set of stratospheric balloon high altitude platforms according to at least one of geographic location, altitude, or time.

5. The method of claim 4, further comprising computing, by the one or more processors, an ability of a given one of the set of stratospheric balloons to remain over a service region based on the data regarding the navigation efficiency.

6. The method of claim 1, wherein the at least one data source includes mobile network statistical intelligence data.

7. The method of claim 1, further comprising retrieving, from the at least one data source, average revenue per user according to at least one of geographic location or time.

8. The method of claim 1, further comprising:
   computing a plurality of revenue scores according to geographic location, wherein the computing of the network expansion potential scores is based on the computed plurality of revenue scores.

9. The method of claim 1, further comprising:
   computing a plurality of cost-of-service scores according to geographic location, wherein the computing of the network expansion potential scores is based on the computed plurality of cost-of-service scores.

10. The method of claim 1, further comprising:
    computing a plurality of revenue scores according to geographic location; and
    computing a plurality of cost-of-service scores according to geographic location, wherein the computing of the network expansion potential scores is based on the plurality of revenue scores and the plurality of cost-of-service scores.

11. The method of claim 10, wherein the visual output includes a graphical representation of the computed plurality of revenue scores.

12. The method of claim 11, wherein the visual output includes a graphical representation of the plurality of cost-of-service scores.

13. The method of claim 1, wherein the visual output includes a graphical representation of the computed plurality of network expansion potential scores.

14. The method of claim 1, wherein at least one of the aggregating, the computing, or the generating, is periodically repeated based on updated data.

15. The method of claim 1, further comprising determining an overprovisioning strategy for the set of stratospheric balloon high altitude platforms.

16. The method of claim 15, wherein determining the overprovisioning strategy includes determining a first number of stratospheric balloon high altitude platforms to cover a service area during a first time period, and a second number of stratospheric balloon high altitude platforms to be staged to cover the service area during a second time period.

17. A system for planning a high altitude platform-based communication network, the system comprising:
    at least one data source, including a data source storing environmental data comprising wind pattern data according to at least one of geographic location, altitude or time;
    a user interface; and
    at least one computing device communicatively coupled to the at least one data source and configured to:
    aggregate data from the at least one data source, wherein the data includes the environmental data;
    determine, based on the aggregated data, whether communication coverage gaps exist in one or more geographic locations to identify a plurality of network expansion potential scores according to geographic location;
    estimate, according to the wind pattern data, a navigation efficiency for a set of stratospheric balloon high altitude platforms, the navigation efficiency estimate indicating a likelihood of keeping a given balloon on station at a selected geographic service region over a period of time;
    evaluate the plurality of network expansion potential scores based on the navigation efficiency to assess potential coverage for an unconnected or under-connected population;
    identify, based on the potential coverage for the unconnected or under-connected population, one or more geographic regions as regions to be served by the high altitude platform-based communication network;

generate a visual output based on the one or more geographic regions as regions to be served by the high altitude platform-based communication networks; and cause the user interface to display the generated visual output.

18. The system of claim 17, wherein the at least one data source includes a source of data regarding navigation efficiency of the set of stratospheric balloon high altitude platforms according to at least one of geographic location, altitude, or time.

19. The system of claim 18, wherein the at least one computing device is further configured to compute an ability of a given one of the set of stratospheric balloons to remain over a service region based on the data regarding the navigation efficiency.

20. A non-transitory computer-readable medium having instructions stored thereon that, when executed by a processor, cause the processor to implement a method for planning a high altitude platform-based communication network, wherein the method comprises:

aggregating data from at least one data source, wherein the data includes environmental data comprising wind pattern data according to at least one of geographic location, altitude or time;

determining based on the aggregated data whether communication coverage gaps exist in one or more geographic locations to identify a plurality of network expansion potential scores according to geographic location;

estimating, according to the wind pattern data, a navigation efficiency for a set of stratospheric balloon high altitude platforms, the navigation efficiency estimate indicating a likelihood of keeping a given balloon on station at a selected geographic service region over a period of time;

evaluating the plurality of network expansion potential scores based on the navigation efficiency to assess potential coverage for an unconnected or under-connected population;

identifying, based on the potential coverage for the unconnected or under-connected population, one or more geographic regions as regions to be served by the high altitude platform-based communication network; and generating, for presentation to one or more users of a display device, a visual output based on the one or more geographic regions as regions to be served by the high altitude platform-based communication network.

* * * * *